United States Patent [19]

Brown

[11] 4,163,772
[45] Aug. 7, 1979

[54] AIR CHARGER

[76] Inventor: William R. Brown, 1018 W. Jackson St., Muncie, Ind. 47305

[21] Appl. No.: 821,324

[22] Filed: Aug. 2, 1977

[51] Int. Cl.² ............................ F01N 3/14; F23G 7/06
[52] U.S. Cl. ...................................... 422/108; 60/286; 60/303; 73/27 R; 324/65 R; 422/168
[58] Field of Search ............... 23/277 C, 288 F; 60/286, 303, 306; 55/DIG. 30; 204/164; 324/61 R, 61 P, 65 R; 73/27 R; 422/108, 168

[56] References Cited

U.S. PATENT DOCUMENTS

| | | | |
|---|---|---|---|
| 3,350,941 | 11/1967 | Misevich et al. | 324/61 R X |
| 3,716,996 | 2/1973 | Maruoka | 23/277 X |
| 3,902,854 | 9/1975 | Brown | 23/277 C |
| 3,979,905 | 9/1976 | Masaki et al. | 60/306 X |

Primary Examiner—Michael S. Marcus
Attorney, Agent, or Firm—Clarence A. O'Brien; Harvey B. Jacobson

[57] ABSTRACT

A continuous flow stream of combustion products conducted through a chamber, is mixed with moisture-laden ambient air and ignited by discharge from a spark plug connected to the high voltage terminal of a secondary winding in an ignition coil assembly having a primary winding connected between a source of d.c. voltage and a terminal exposed to a gaseous mixture in the chamber. The high voltage applied to the spark plug is induced by intermittent interruption of the flow of current through the ionized gaseous mixture grounded in the chamber, resulting from restricted inflow of said moisture-laden air into the chamber.

8 Claims, 6 Drawing Figures 4,163,772

AIR CHARGER

BACKGROUND OF THE INVENTION

This invention relates to the treatment of combustion products discharged from different sources such as internal combustion engines and industrial processes and is an improvement over the type of anti-pollution devices disclosed in my prior U.S. Pat. No. 3,902,854.

In my prior U.S. Pat. No. 3,902,854, an ignition coil and spark plug within a suitable protective housing are installed within a heat resistant chamber through which a mixture of exhaust gas and moisture-laden air is conducted. The low voltage terminals of the ignition coil are connected to a d.c. voltage source and a high voltage is induced by a conventional circuit breaker to generate a spark through the spark plug within the chamber. To be effective under varying conditions, voltage regulation and spark discharge timing controls are necessary for operation of the foregoing type of anti-pollution devices. However, such controls are not only costly but introduce other problems and involve certain sacrifices in the efficiency of the anti-pollution device. It is therefore an important object of the present invention to provide an improvement to the antipollution device of the aforementioned type which is self-regulatory with respect to voltage and timing and thereby more effective under varying conditions in a less costly manner.

PRIOR ART STATEMENT

Aside from my prior U.S. patent aforementioned and the other prior patents listed and made of record therein, I and those substantively involved in preparing this application are not aware of any other pertinent prior art. The present invention as claimed is believed to be patentable over the foregoing prior patents referred to.

SUMMARY OF THE INVENTION

In accordance with the present invention, an ignition coil device and a spark plug may be protectively mounted on and/or isolated from a heat resistant enclosure for a chamber through which a flow stream of combustion products is conducted, in a physical arrangement similar to that disclosed in my prior U.S. patent aforementioned. However, no mechanical circuit breaker is utilized to induce the high voltage necessary to generate the spark for igniting the exhaust gases. Instead, the negative low voltage terminal of the ignition coil device is merely exposed to the atmosphere within a non-conductive enclosure. Accordingly, the voltage induced in the ignition coil device will be controlled by the changes in the electrically conductive state of the grounding atmosphere within the enclosure chamber. The conductive state of the chamber atmosphere will depend on the composition of the combustion products, the effect of the spark plug discharge thereon, and the restricted inflow of moisture-laden ambient air through an anterior opening in the enclosure closely spaced from the inlet for the combustion products. A vent opening provided adjacent the outlet from the enclosure, permits escape and/or draining of excess water resulting from the reaction caused by the spark plug discharges.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
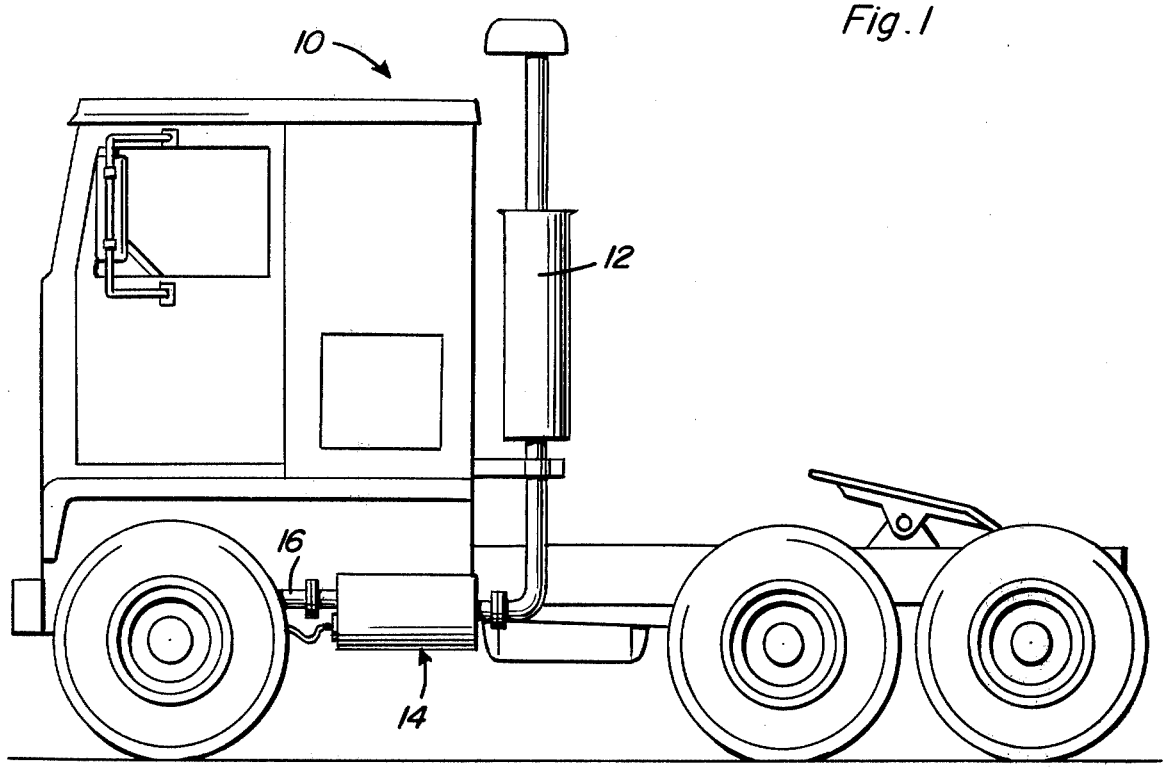
FIG. 1 is a side elevational view of an automotive tractor vehicle illustrating a typical installation of the present invention.

Referring now to the drawings in detail, FIG. 1 illustrates a conventional type of automotive tractor vehicle 10 propelled by an internal combustion engine from which combustion products are ordinarily discharged through a muffler 12 to atmosphere. In accordance with the present invention, an anti-pollution device generally referred to by reference numeral 14 is installed between the tail pipe 16 of the engine and the muffler 12 for treatment of the combustion products. A less polluting exhaust gas is thereby discharged from the muffler.

A heat resistant conical enclosure 18 has an inlet section 20 connected to one axial end to which the engine tail pipe is connected. Combustion products from the engine are thereby conducted into the chamber 22 enclosed by the enclosure 18. An outlet section 24 connects the opposite axial end of the enclosure to the muffler so that a flow stream of combustion products is continuously conducted through the chamber 22 during engine operation.

An anterior vent opening 26 is formed in the enclosure at the inlet end spaced from the inlet section 20 so as to accommodate the inflow of moisture-laden ambient air into chamber 22. Inflow of air is induced by the flow of combustion products through the chamber 22 at a relatively high velocity producing a suction pressure therein. The size of opening 26 is such as to meter the quantity of ambient air mixed with the combustion products in chamber 22 so as to obtain a desired degree of electrical conductivity for the gaseous mixture. The inflow of ambient air will also have a cooling effect on the enclosure 14, augmented by the outflow, escape, venting or draining of excess water either in liquid form or as vapor through a posterior vent opening 28 formed in the outlet end of the enclosure spaced from outlet section 24. The excess water is produced by the reaction caused by sparking of a unit 30 mounted at the inlet end of the enclosure within chamber 22.

The unit 30 includes a conical housing 32 made of an electrically nonconductive material having a base flange 34 received between the end wall of enclosure 18 and arcuate retainer elements 36 mounted exteriorly thereon. The housing 32 projects through an opening in the end wall of the enclosure into chamber 22 terminating at an apex portion 38 from which the electrodes of a conventional type spark plug 40 project. The spark plug is electrically and physically connected to the high voltage terminal 42 of a conventional type of automotive ignition coil device 44 protectively wrapped in aluminum foil. In the embodiment shown in FIG. 4, the housing 32 is dimensioned to hold the spark plug 40 and ignition coil device 44 in assembled relation to each other with one of the low voltage power terminals 46 of the ignition coil device connected by lead 48 to a source of d.c. voltage through an external terminal 50. The other low voltage terminal 52 of the ignition coil device is capped with a rubber or plastic cover within chamber 22 which communicates with the interior of housing 32 through opening 54. Current from the voltage source is conducted to the external terminal 50 by a graphite or resistive wire cable 55 to avoid deterioration and limit charging current. The cable 55 may have a reistance of approximately 1.35 ohms.

Figure 6:
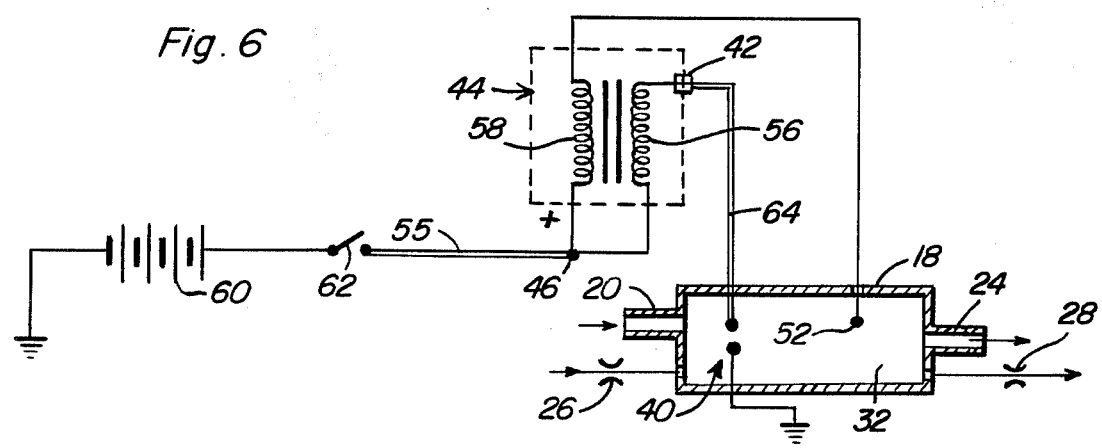
FIG. 6 is a circuit diagram illustrating the electrical system associated with the anti-pollution device.

FIG. 6 diagrammatically shows the spark plug 40 within chamber 22 and connected to the high voltage terminal 42 of the secondary winding 56 associated with the ignition coil device 44. The low voltage terminal 52 exposed to the gaseous mixture in chamber 22 is shown connected to the primary winding 58. The primary and secondary windings are connected to the d.c. source through low voltage power terminal 46. As shown, the low voltage source is a grounded vehicle battery 60 in the case of an automotive vehicle installation. The ignition switch 62 connects the battery to the low voltage terminal 46 to render the anti-pollution device operative only during engine operation.

It will become apparent from FIG. 6 that the d.c. voltage applied to the coil device 44 will establish an electric field within chamber 22 in view of the grounding of its moisture laden atmosphere through the muffler shell, for example, to ionize the gaseous mixture when in an electrically conductive state and thereby complete an electrical circuit through the primary winding 58. The inflow of ambient, moisture-laden air into chamber 22 alters the electrically conductive state of the gaseous mixture including de-ionization to produce a change in the volt drop across the windings so as to induce a high voltage across the secondary winding 56 and intermittently discharge across the gap between the electrodes of the spark plug within chamber 22. The spark so generated ignites and causes a reaction of the combustion products in chamber 22 with a frequency and voltage dependent on the inflow of ambient air, its moisture content and the composition of the combustion products. A 4:1 flow ratio of combustion products to air was found suitable for an automotive engine installation.

Figure 4:
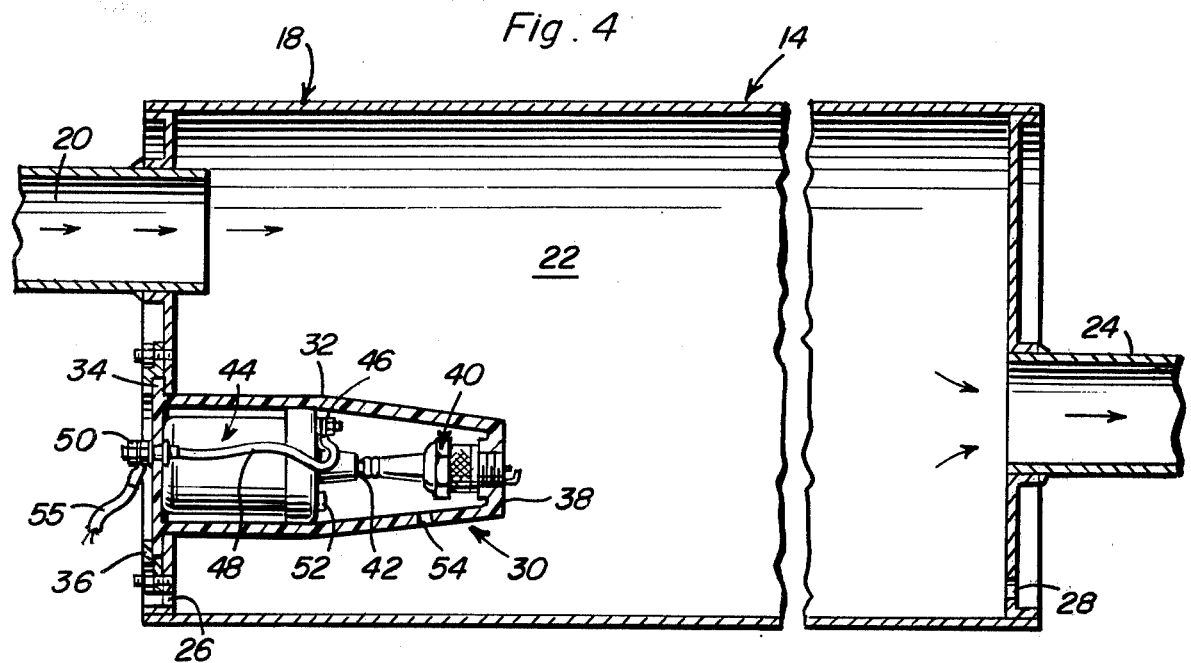
FIG. 4 is a partial side section view of the anti-pollution device of the present invention.
Figure 5:
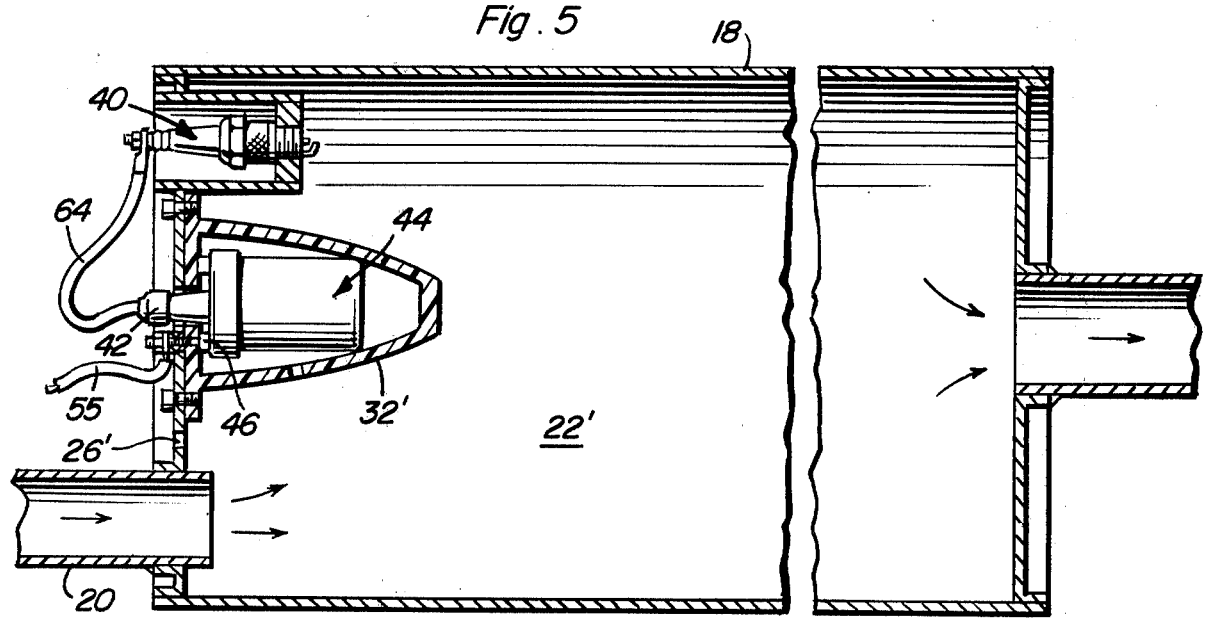
FIG. 5 is a partial side section view showing a modified form of an anti-pollution device.

A modification of the arrangement illustrated in FIG. 4, is shown in FIG. 5, wherein the enclosure 18' is provided with an inlet section 20' and anterior vent 26' at the inlet end wall on which a conical housing 32' is mounted to enclose an aluminum wrapped ignition coil device 44 alone. The housing 32' and the low voltage terminal 52 is capped as in the case of the anti-pollution device 14 shown in FIG. 4. The low voltage terminal 46 is directly connected to the d.c. voltage source through the resistance wire 55. The high voltage terminal 42 is connected by a carbon conductor 64 to the spark plug 40 which is mounted on the inlet end wall of enclosure 18' separately from the housing 32'. Operation of the anti-pollution device shown in FIG. 5 is otherwise the same as device 14 as described with respect to FIG. 6.

Figure 2:
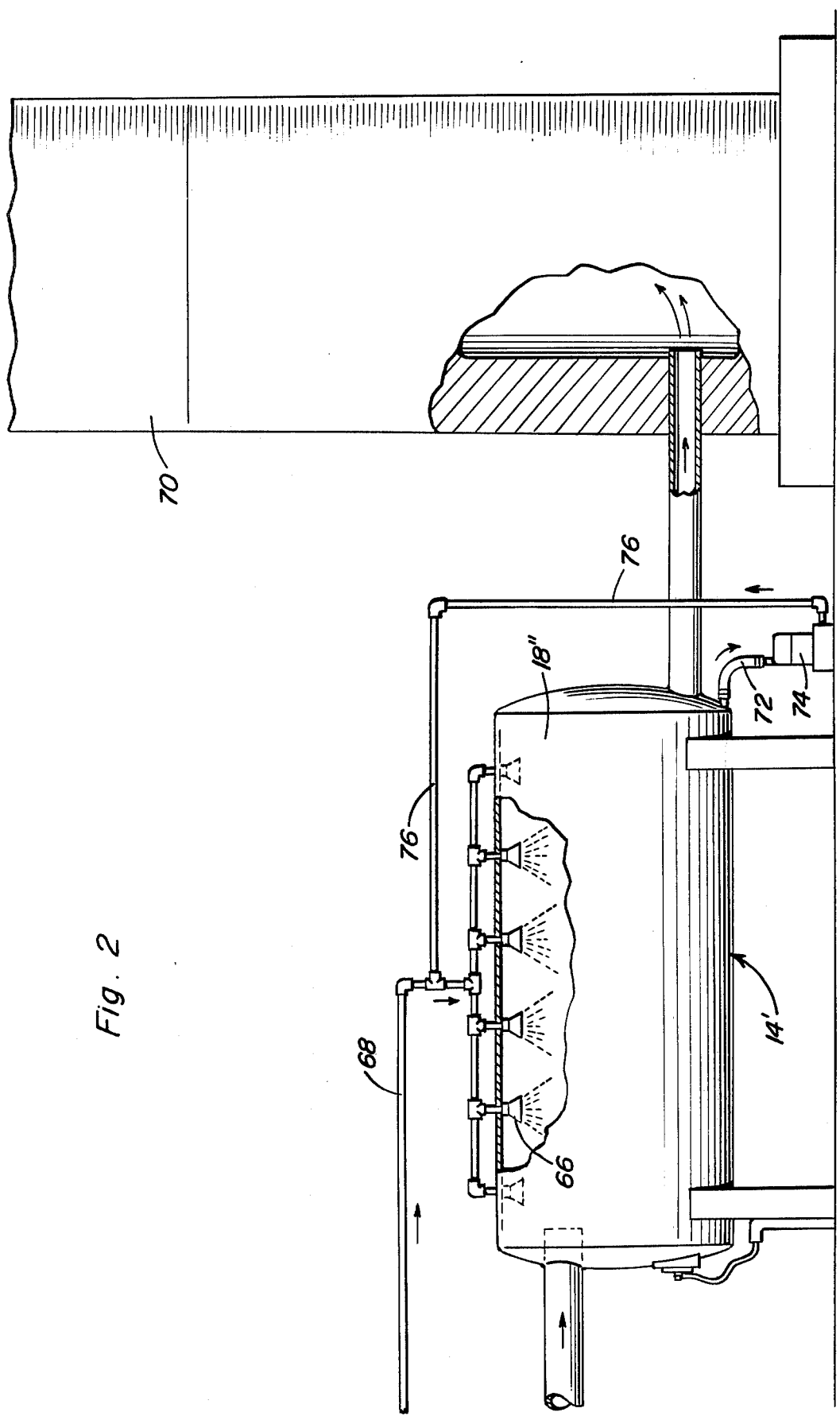
FIG. 2 is a partial side elevational view with parts broken away and shown in section illustrating an industrial type of installation for the present invention.

In FIG. 2, an anti-pollution device 14' similar to device 14 shown in FIG. 4, is installed at an industrial site where a high sulfur coal is being burned, for example. In such an installation, the moisture content of the inflowing ambient air is insufficient so that a plurality of spray heads 66 are mounted in the enclosure 18" to which water is fed from a suitable source through pipe 68. A pollution free exhaust is accordingly fed to the chimney stack 70. In this embodiment of the invention, a larger quantity of excess water is drained from the enclosure 18" through drain outlet 72. A recirculating pump 74 recycles the drained water through pipe 76 to the spray heads 66 through which misted water is injected into the exhaust treating chamber.

Figure 3:
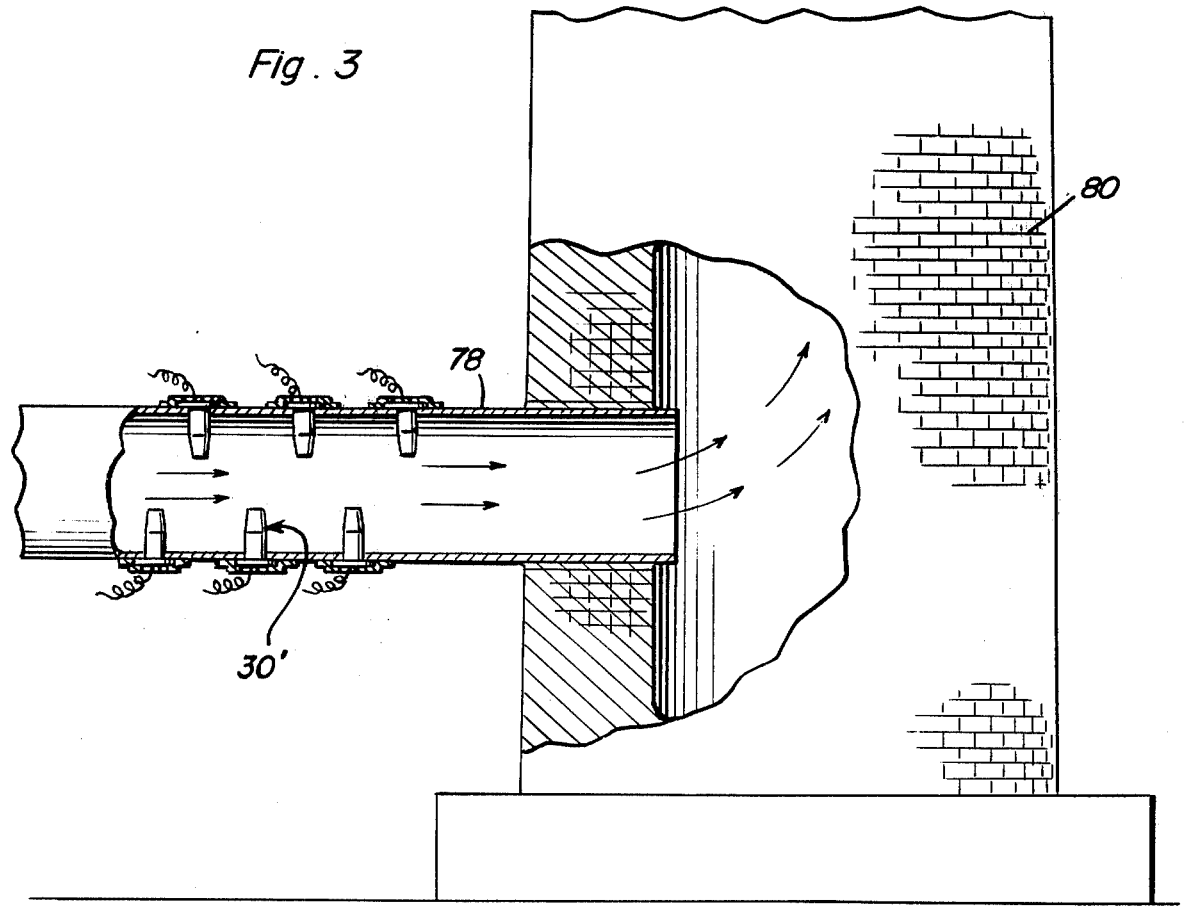
FIG. 3 is a partial side elevational view illustrating yet another installation of the present invention.

In FIG. 3, the anti-pollution arrangement shown comprises a plurality of units 30', similar to the unit 30 described with respect to FIG. 4. The units 30' are installed in an enlarged conduit 78 through which combustion products are conducted to a chimney stack 80. The units 30' operate to ignite the combustion products with a frequency and voltage that is self-regulated as hereinbefore described with respect to FIGS. 4 and 6.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a non-conductive enclosure having a chamber through which a flow of electrically grounded combustion products is conducted to atmosphere, exhaust treating means connected to said enclosure, comprising d.c. voltage means, a spark plug mounted on said enclosure and projecting into the chamber, an ignition coil device connecting the d.c. voltage means to the spark plug, means responsive to said flow of said combustion products through the chamber for inducing a restricted inflow of moisture laden externally ambient air into the chamber to produce a gaseous mixture therein of varying electrical conductivity, and terminal means connected to said ignition coil device for inducing a spark generating voltage in the ignition coil device as a result of said varying electrical conductivity causing discharges from the spark plug within the chamber, said ignition coil device including primary and secondary windings connected to the d.c. voltage means, said primary winding having a low voltage terminal connected to the terminal means, said terminal means being exposed to the grounded combustion products in the chamber, said secondary winding having a high voltage terminal connected to the spark plug.

2. The combination of claim 1 including a carbon conductor connecting the high voltage terminal to the spark plug.

3. The combination of claim 1 including vent means for permitting escape of excess water resulting from reactions caused by said discharges of the spark plug.

4. The combination of claim 1 including protective housing means enclosing the ignition coil device within the chamber having an opening through which the terminal means is exposed to combustion products.

5. The combination of claim 4 including spray means for injecting water into the chamber to maintain a predetermined ratio of moisture to ambient air within the chamber.

6. The combustion of claim 5 including a chimney stack to which the enclosure is connected.

7. In combination with an enclosure through which a flow of electrically grounded exhaust products is conducted to atmosphere, exhaust treating means connected to said enclosure, comprising, d.c. voltage means, spark plug means mounted in the enclosure for igniting the exhaust products, ignition coil means connected to said d.c. voltage means for supply of current to the spark plug means, means responsive to said flow of the exhaust products for inducing a restricted inflow of externally ambient air into the enclosure to vary the conductivity of said exhaust products, and means connected to the ignition coil means for controlling the current supplied to the spark plug means in accordance with the conductivity of the exhaust products in the enclosure, said current controlling means including a terminal exposed to the exhaust products in the enclosure, said ignition coil means including a primary winding connected between the d.c. voltage means and said terminal and a secondary winding connected between the d.c. voltage means and the spark plug means.

8. The combination of claim 7 wherein said d.c. voltage means is a vehicle battery, and ignition switch means connecting the battery to the ignition coil means for operation of the exhaust treating means during operation of the internal combustion engine.

* * * * *